United States Patent
Weimann et al.

(10) Patent No.: US 11,420,827 B2
(45) Date of Patent: Aug. 23, 2022

(54) BELT SCRAPER AND METHOD FOR OPERATING A BELT SCRAPER

(71) Applicant: HOSCH Fördertechnik GmbH, Herne (DE)

(72) Inventors: Claus Weimann, Wetter (DE); Martin Kiel, Recklinghausen (DE)

(73) Assignee: HOSCH Fördertechnik GmbH, Herne (DE)

( * ) Notice: Subject to any disclaimer, the term of this patent is extended or adjusted under 35 U.S.C. 154(b) by 0 days.

(21) Appl. No.: 17/279,997

(22) PCT Filed: Sep. 16, 2019

(86) PCT No.: PCT/EP2019/074729
§ 371 (c)(1),
(2) Date: Mar. 25, 2021

(87) PCT Pub. No.: WO2020/064405
PCT Pub. Date: Apr. 2, 2020

(65) Prior Publication Data
US 2022/0033192 A1 Feb. 3, 2022

(30) Foreign Application Priority Data
Sep. 26, 2018 (DE) .............. 10 2018 123 799.5

(51) Int. Cl.
*B65G 45/12* (2006.01)
*G01B 7/30* (2006.01)
*B65G 45/16* (2006.01)

(52) U.S. Cl.
CPC .............. *B65G 45/12* (2013.01); *B65G 45/16* (2013.01); *G01B 7/30* (2013.01); *B65G 2203/043* (2013.01); *B65G 2203/044* (2013.01)

(58) Field of Classification Search
CPC .......... G01B 7/30; B65G 45/12; B65G 45/16; B65G 2203/043; B65G 2203/044
(Continued)

(56) References Cited

U.S. PATENT DOCUMENTS 4,269,301 A * 5/1981 Gibbs ................... B65G 45/16
198/499
4,768,645 A 9/1988 Farris
(Continued)

FOREIGN PATENT DOCUMENTS

DE 19926184 A1 12/2000
DE 10249031 * 6/2003 ............ B65G 45/10
(Continued)

OTHER PUBLICATIONS

International Search Report and Written Opinion of International Searching Authority for International Application No. PCT/EP2019/074729, with English translations, dated Jan. 23, 2020 (19 pages).

*Primary Examiner* — James R Bidwell
(74) *Attorney, Agent, or Firm* — Nixon Peabody LLP

(57) ABSTRACT

A belt scraper having a scraper element to be brought into abutment with a belt. The scraper element is pivotably arranged with reference to a pivoting axis. A spring element generates a torque acting on the scraper element. A sensor for determining a pivoting angle of the scraper element is a contactless sensor with an index part and a detecting part for detecting the position of the index part. The index part is arranged, at a distance from the pivoting axis, on a movable element that is coupled to the scraper element.

12 Claims, 6 Drawing Sheets

(58) Field of Classification Search
USPC .................................................. 198/497, 499
See application file for complete search history.

(56) References Cited

U.S. PATENT DOCUMENTS

| | | | | |
|---|---|---|---|---|
| 5,248,026 A * | 9/1993 | Morefield | ............... | B65G 45/16 198/499 |
| 5,622,249 A * | 4/1997 | Morin | .................... | B65G 45/16 15/256.6 |
| 6,003,657 A * | 12/1999 | Mott | ....................... | B65G 45/16 198/499 |
| 8,205,741 B2 * | 6/2012 | Swinderman | .......... | B65G 45/16 198/571 |
| 2007/0029169 A1 | 2/2007 | Swinderman | | |
| 2016/0001329 A1 | 1/2016 | Schwarzwe | | |

FOREIGN PATENT DOCUMENTS

| | | |
|---|---|---|
| DE | 10246573 A | 4/2004 |
| DE | 102004014084 A1 | 10/2004 |
| DE | 102007062862 A1 | 7/2008 |
| DE | 102010002109 A | 8/2011 |
| DE | 102017114931 A1 | 7/2018 |
| EP | 2941394 | 7/2016 |
| WO | WO 2014/106621 A2 | 7/2014 |
| WO | WO 2019/126664 A1 | 6/2019 |

\* cited by examiner

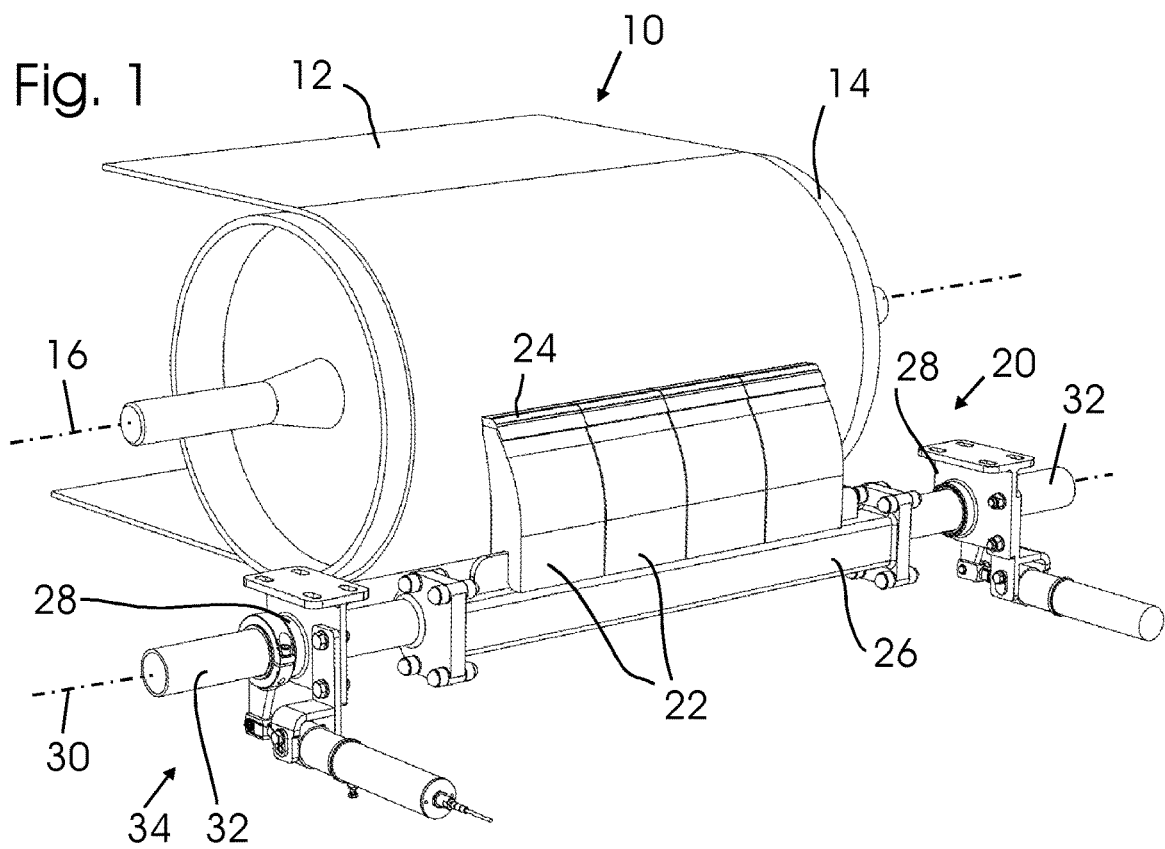
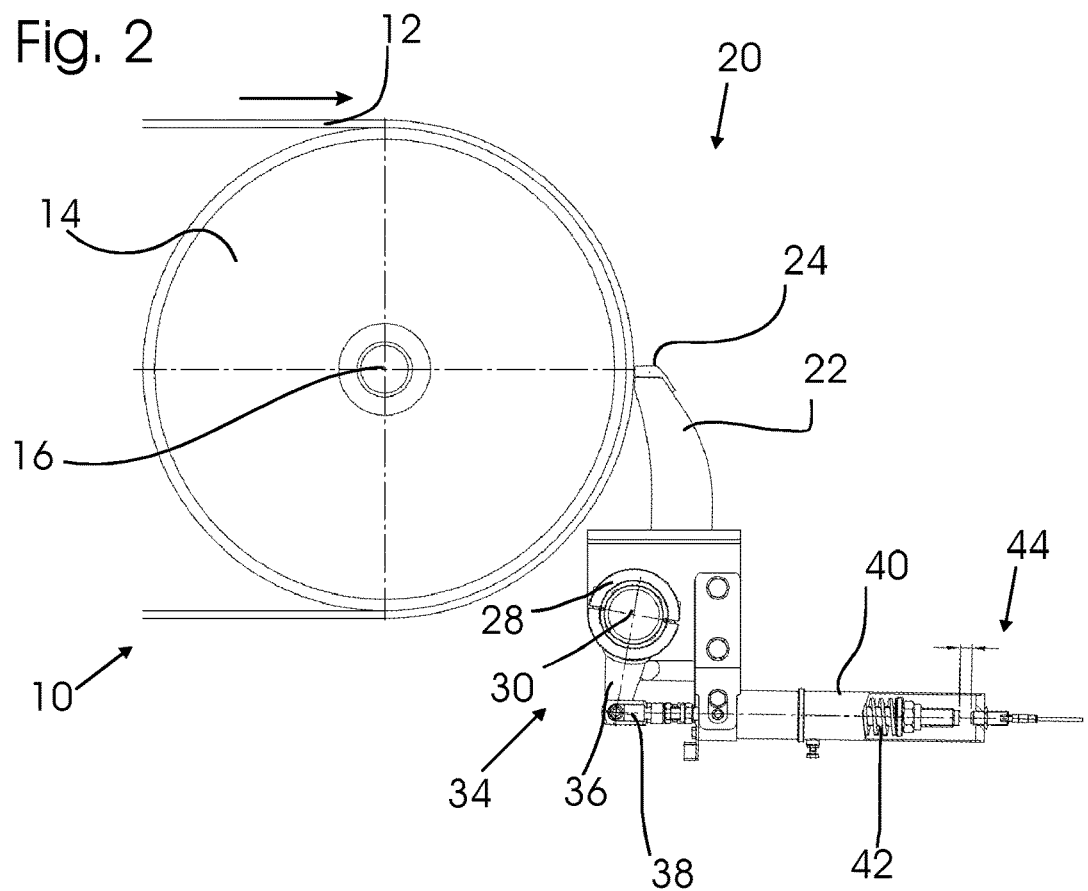

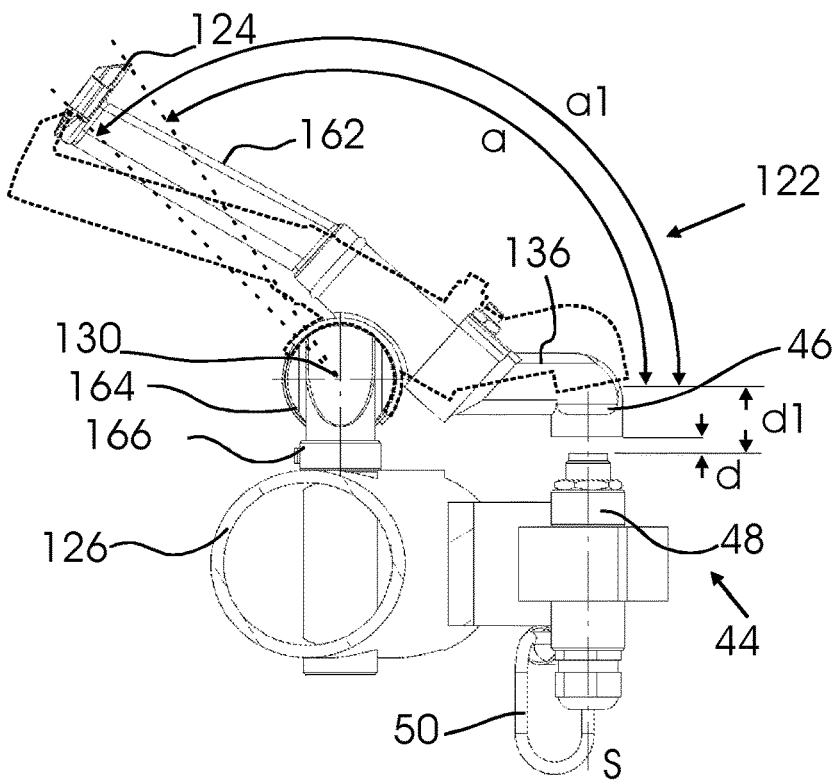
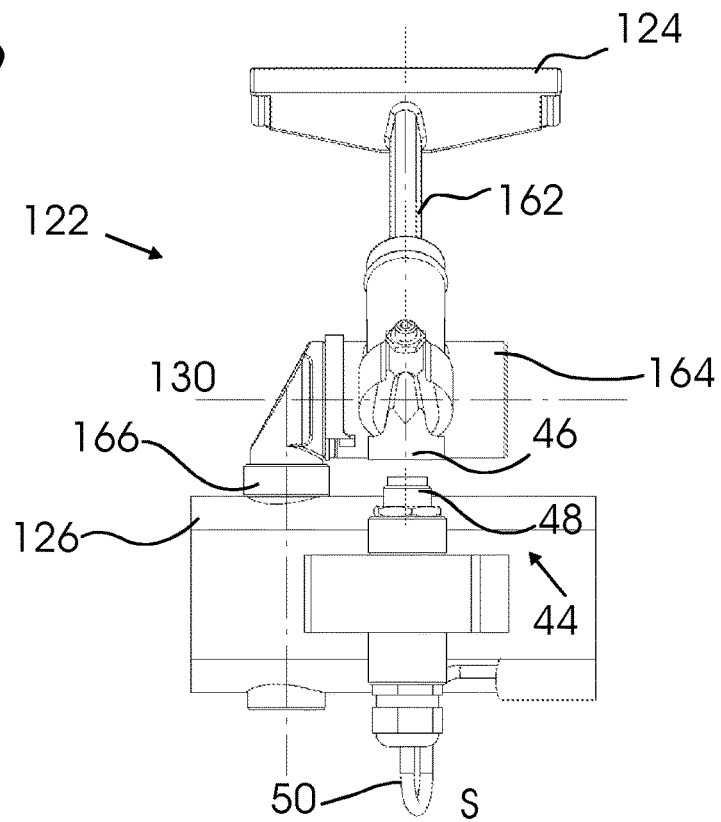

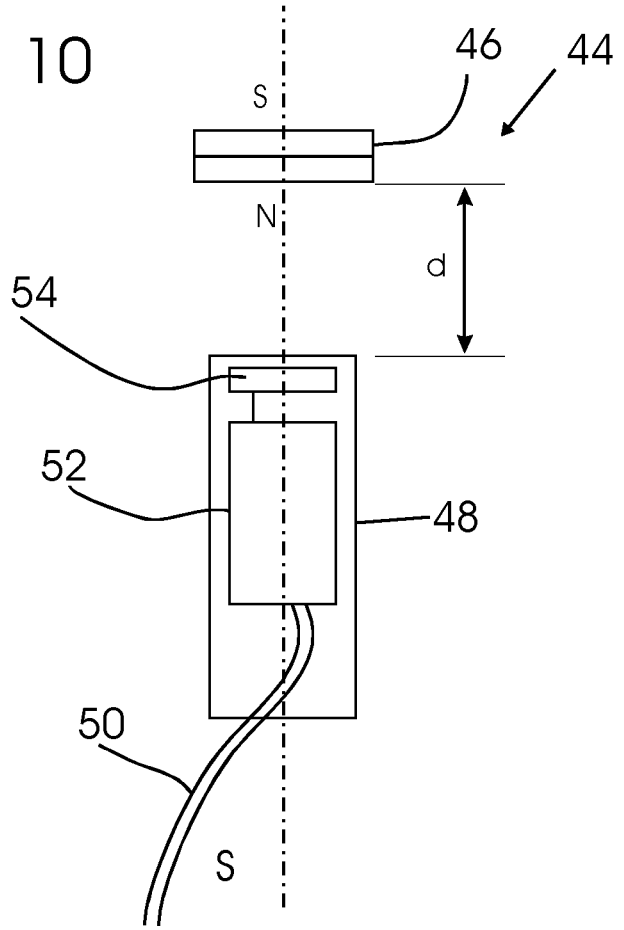

BELT SCRAPER AND METHOD FOR OPERATING A BELT SCRAPER

CROSS-REFERENCE TO RELATED APPLICATIONS

This application is a U.S. National Stage of International Application No. PCT/EP2019/074729, filed Sep. 16, 2019, which claims the benefit of Germany Patent Application No. 10 2018 123 799.5, filed Sep. 26, 2018, both of which are incorporated herein by reference in their entireties.

The invention relates to a belt scraper and a method for operating it.

Belt scrapers are used for conveyor belts that are used for conveying a variety of different conveyed materials. By placing a scraper element in abutment with the running belt, conveyed material adhering to it is scraped off.

Different types and constructions of belt scrapers are known. For example, DE 10 2017114 931 A1 shows a scraper system for the direction change area, formed by an ejection drum, of fast running belt conveyors. On a system carrier oriented transversely to the running direction of the belt conveyor, scraper blocks made from an elastic material are attached side by side. The system carrier is suspended, by means of a carrier bracket, rotatably on both sides around a carrier axis of rotation. Using a spring device, a specifiable torque is applied which is oriented against the direction of rotation of the ejection drum. The carrier axis of rotation allows for a rotation of the system carrier around such a rotation angle that an evasive movement of the system carrier together with its scraper blocks can take place.

WO 2014/106621 A2 describes a belt scraper module for a scraper device for the return area of conveyors. Several belt scraper modules are mounted on a system carrier the height of which is adjustable. Each module has a foot that is attached to the system carrier and a cutter carrier to which a scraper blade with a scraper edge is affixed. Each module furthermore has a scraper body with a jointed housing that has two joints. The axis of rotation of a first joint extends transversely to the running direction of the belt. A second joint has a bushing in which the cutter carrier is rotatably mounted and the axis of rotation of said cutter carrier extends longitudinally to the running direction of the belt. The first joint is equipped with a spring angle measurement and a fixed stop for the deflection. In an embodiment, an apparatus is provided on the side of the module to which the latching stop is affixed for the electronic measurement of rotation angles, such apparatus being able to be integrated for example in the cover cap. The rotation angle position can be determined, digitized, and converted into a signal.

US 2007/0029169 A1 discloses a scraper for cleaning the surface of a conveyor belt. A body of the scraper comprises a foot, which is attached to a transverse carrier, and a scraper element, which extends from the foot up to a scraper tip. The scraper comprises electrical sensors that are embedded in an insert. In an embodiment, the transverse carrier is arranged with scrapers, a rotary actuator, and brackets and mounted to be pivotable around an axis. A linear actuator with a cylinder and a piston for pneumatic or hydraulic operation is arranged on a bracket and a stationary element. An actuator can comprise a position sensor in order to generate a signal for displaying the actuator position from which the position and the cleaning angle of the scraper can be calculated.

It can be considered the object to propose a belt scraper and an operating method therefor, which enable an exact determination of information related to the operating status, that is as simple as possible without impairing operation in the process.

The object is solved by a belt scraper according to claim 1 and by an operating method according to claim 11. Dependent claims refer to advantageous embodiments of the invention.

The belt scraper according to the invention has at least one scraper element to be brought into abutment with a belt. A scraper element can be understood to be a body of any type and shape that is suitable for having a scraping effect when brought into abutment with a belt. The scraper element can for example abut the belt in a scraping or non-scraping manner.

As a contact surface with the belt, a flat or linear abutment is preferred. The scraper element can be designed for example in a block shape as is shown in DE 10 2017114 931 or as a blade as shown in WO 2014/106621 A2. The scraper element can consist of different materials, for example plastic or metal, in particular hard metal. In particular, the scraper element can be structured as multiple parts, for example as a block made from plastic or rubber, which is fitted with a trim made from metal, for example hard metal.

The scraper element is arranged so as to be pivotable around a pivot axis. The pivot axis extends preferably at least substantially transversely to the running direction of the belt, i.e., for example parallel with the axis of rotation of a deflection drum or an ejection drum. In this context, the scraper element is arranged rotatably in such a way that it can be lifted off the belt by a pivoting movement around the pivot axis. Thus, the scraper element can pivot away in order to allow obstacles on the belt such as belt faults or thickened areas to pass by.

According to the invention, the scraper element is in abutment with the belt with a force being applied, i.e., it is pre-tensioned, i.e., a torque around the pivot axis acts on the scraper element in the direction towards the abutment position of the scraper element on the belt. In order to generate a torque, at least one spring element is provided according to the invention, wherein preferably several spring elements, for example at least one on each side, are arranged. The spring element can be designed differently, for example preferably as a helical spring, but alternatively also for example as a leaf spring, torsion rod spring, plate spring, or block spring. The spring element can be arranged in a spring device, i.e. interact with for example a lever or another mechanical element that is coupled with the scraper element. In this context, the spring element can act for example as a tension or compression spring.

In operation, the scraper element is thus in abutment in a pre-tensioned state due to the spring action, but it can be elastically pivoted away against the spring force. When it is pivoted away and subsequently returned to its original position in the scraping position, this therefore results in a variable pivoting angle.

The spring element can also be coupled with at least one damping element in order to enable a dampened movement of the scraper element in order to thus ensure a particularly good abutment of the scraper element with the belt. In the case that a block spring is used, for example a block made from rubber or an elastomer, as a compression or tension spring, dampening and spring properties can be realized in one element.

Combinations of different types of spring elements and/or dampening elements, for example a combination of a helical spring with a block spring, are also possible.

According to the invention, a sensor is provided for determining the respective current pivoting angle of the scraper element. The sensor according to the invention functions based on a contactless measuring principle and comprises at least one index part and one detecting part that are movable relative to one another and are preferably completely independent from one another. The detecting part is configured and suitable for detecting the position of the index part relative to the detecting part. Preferably, the detecting part is at least suitable for detecting the distance from the index part; alternatively or additionally, a detection of the orientation, i.e., for example a rotational position of the index part relative to the detecting part, can also take place.

According to the detection of the position of the index part, the sensor can supply a signal, preferably as an electrical signal, for example as an analog current and/or voltage signal and, alternatively or additionally, as a digital signal.

The detection of the index part can take place based on any contactless sensor principle, for example optical (for example by means of laser, infrared, etc.), acoustical (e.g. by means of ultrasound), capacitive, inductive, magnetic, magneto-inductive, etc. Preferably, the index part is autonomous, i. e. requires, except for a mechanical attachment, no functional connection, in particular no electrical connection. Whereas an electrical power supply for example via a battery, a rechargeable battery, or a wireless feed of electrical power is conceivable, the index part preferably does not require any power supply. The index part can generate or modify a field and/or a wave of the medium used for detecting (e.g. optical, magnetic, electrical, acoustic).

Preferably, the index part of the sensor can comprise at least one magnetic element and the detecting part can comprise at least one magnetic field sensor element. The magnetic element can be for example a permanent-magnet element. The magnetic field sensor element can for example comprise a Hall sensor element and/or a magnetically soft element with a coil arrangement, in particular a magnetically soft element with high permeability.

The detecting part is equipped with means for detecting the position of the index part. Preferably, the detecting part can have an electrical detection and analysis circuit that can be operated to generate a sensor signal dependent upon the position of the index part. The detecting part can have an electrical connection cable by means of which the electrical supply power can be fed in to operate the electric circuit. The electrical connection cable can, alternatively or additionally, also serve to transmit an electrical sensor signal.

According to the invention, the index part is arranged on a movable element that is coupled with the scraper element at a distance from the pivoting axis.

The movable element that is coupled with the scraper element can be for example a rod, an arm, or another mechanical element that is mechanically coupled with the scraper element in such a way that it executes a movement that is coupled with the pivoting movement. For example, the index part can be attached to an arm that is coupled to the scraper element in a rigid manner with regard to the pivoting axis and thus will always execute the same pivoting movement as said scraper element. Aside from such a direct coupling of the movable element, there can also be an indirect coupling, for example via one or several joints; for example, the movable element can be hinged on the scraper element or an arm that is rigid relative to the scraper element. In any case, it is a movable part on which the index part is arranged at a distance from the pivoting axis, so that a pivoting movement of the scraper element will cause a movement coupled therewith of the movable element and thus of the index part. The movement of the index part can for example be linear, arcuate, or follow another type of path. In any case, a conclusion as to the pivoting movement of the scraper element is possible by means of detecting the position of the index part.

In particular for an autonomously designed index part this design offers advantages, since for example no electrical connection must be guided to the movable element, for example via cable.

The arrangement of the index part at a distance from the pivoting axis, on the one hand, enables a simplified design, i. e. for example, a jointed design can remain unchanged, and the sensor can be arranged outside the joint, preferably at a radial distance from the joint. On the other hand, the pivoting movement at a distance from the pivoting axis also results in a greater stroke, which can be detected well by a distance sensor. For example, the index part can have a distance from the pivoting axis that is at least 5%, preferably at least 20%, particularly preferred 50% or more of the distance of the forward-most edge of the scraper element from the pivoting axis.

In a preferred embodiment, the detecting part can be arranged on a stationary element or at least on an element that executes a significantly smaller movement relative to a stationary element than the scraper element. The term "stationary" shall here be understood as an element not changing its position when the scraper element executes a pivoting movement, for example in order to allow a belt defect to pass by. Preferably, a stationary element is arranged in a fixed and immobile manner relative to the conveyor frame of the belt. If the detecting part is not affixed to a completely stationary element, it can preferably be attached to an element that is movable to a lesser extent. Such an element can be understood to be an element which executes a reduced pivoting movement compared to the pivoting movement of the scraper element, i.e., for example a pivoting movement by a significantly reduced pivoting angle, which amounts to for example less than half of the pivoting angle of the scraper element, or preferably even less than a quarter of the pivoting angle of the scraper element.

In an embodiment, a pivoting arm is provided which extends from the pivoting axis and is coupled with the scraper element. The pivoting arm is preferably arranged rigidly relative to the scraper element so that it pivots by the same pivoting angle when the scraper element executes a pivoting movement. Preferably, the pivoting arm extends in a direction which forms an obtuse angle with the direction of the scraper element, i.e., an angle of more than 90°. In this context, the direction from the pivoting axis to the end of the pivoting arm is examined with regard to the pivoting arm, and the direction from the pivoting axis to the front edge of the scraper element is examined with regard to the scraper element. Such directions are preferably arranged at least substantially opposite one another so that the angle enclosed therein is greater than 90°. Due to the opposite arrangement, the pivoting arm can be arranged such that an enlarged distance from the scraping area results.

The index element can, for example, be arranged on the mentioned pivoting arm. Alternatively, it can also be arranged on an element that is coupled with the pivoting arm, for example a rod hinged thereon. Such a rod can for example be designed as a pull or push rod and serve to transfer a force acting on the pivoting arm with which a torque is generated that acts on the scraper element. For this purpose, for example a spring element can be coupled with the rod. Alternatively, a spring element can also be directly coupled with the pivoting arm in order to generate a torque.

In an embodiment, the rod can be mounted inside a surrounding housing to be movable relative to such housing, wherein the detecting part of the sensor is arranged on the housing and the index part is arranged on the rod. Preferably, the housing can be cylindrical and the rod can move in the longitudinal direction therein. Also preferably, the relative movement of the rod detected by the sensor relative to the housing is at least substantially a linear movement that is particularly easy to detect.

The sensor can be arranged in the axial direction of the pivoting axis directly on the scraper element or in the vicinity thereof. For some embodiments, it can, however, also be preferred that the scraper element and the sensor be arranged in the axial direction of the pivoting axis at a distance from one another. For example, the sensor can thus be arranged in a manner that is laterally distanced from the belt area so that it is not impaired by conveyed material that was scraped off. For example, the scraper element can be arranged on a rotatable shaft. At least one bearing can be provided in order to rotatably mount the shaft, it is preferred that there be two bearings arranged at a distance from one another. In an embodiment, the sensor can be arranged on the outside, i.e., so that at least one bearing is arranged axially between the sensor and the scraper element.

In an embodiment, a carrier can be provided that extends for example in a transverse direction to the running direction of the belt, preferably at least across the belt width. The carrier can be preferably arranged in a stationary manner. On the carrier, preferably at least a foot part of a scraper module can be attached; it is preferred that several scraper modules be provided on the carrier. A joint can be arranged on the foot part in which the scraper element is pivotably mounted, for example on a scraper element carrier that extends from the joint in the direction of the scraper element. Preferably, the detecting part is attached to the carrier. If several scraper modules are arranged with their foot parts on the carrier, for example only one sensor can be provided with a detecting part on one of the modules, or several sensors can be provided the detecting parts of which are then preferably attached side by side on the carrier.

It has proven to be advantageous to arrange the sensor in such a way as to arrange the pivoting axis, viewed in the running direction of the belt, between the sensor and the scraper element. Thus, the sensor is arranged at a distance from the scraping area whenever possible.

In the following, embodiments of the invention will be further described with reference to the drawings. In the drawings:

FIG. 1 shows a perspective view of a first embodiment of a belt scraper;

FIG. 2 shows the belt scraper from FIG. 1 in a side view;

FIG. 8 shows the scraper module from FIG. 6, 7 in a side view with different pivoting positions;

FIG. 9 shows the scraper module from FIG. 6-8 in a front view;

FIG. 10 shows a schematic representation of elements of a sensor with an index part and a detecting part.

Figure 3:
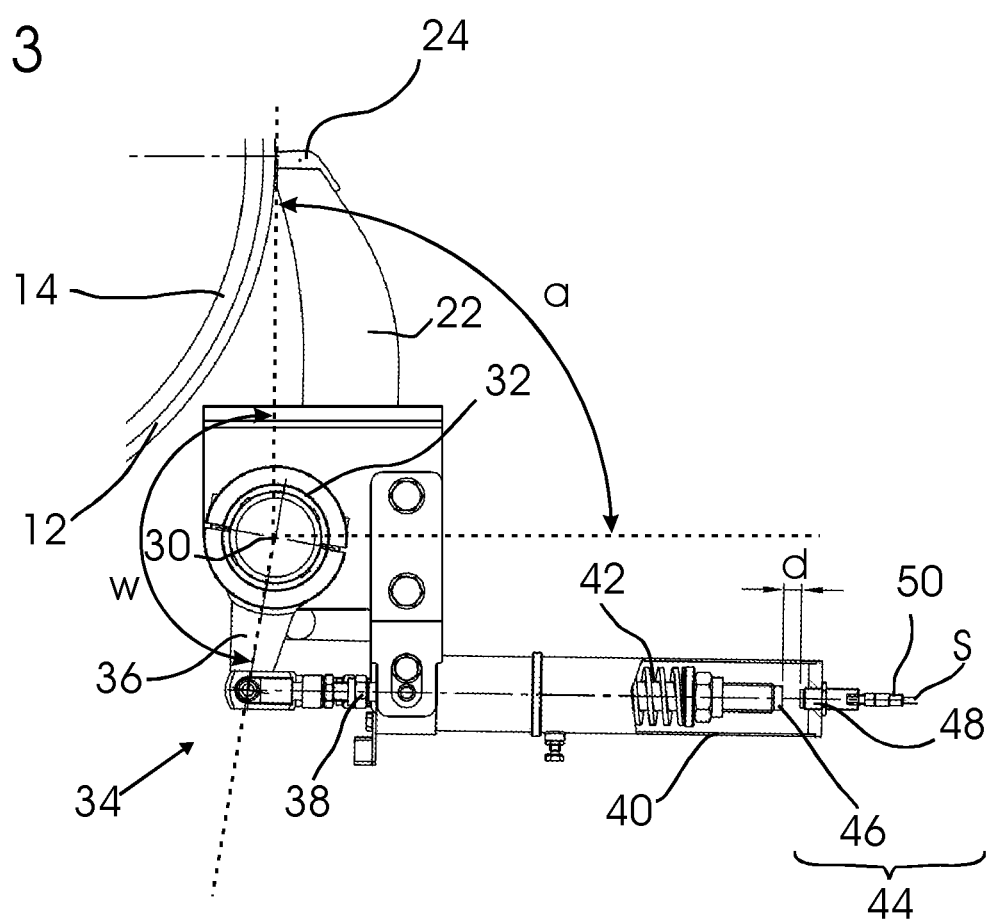
FIG. 3 shows an enlarged partial view of the representation from FIG. 2.
Figure 4:
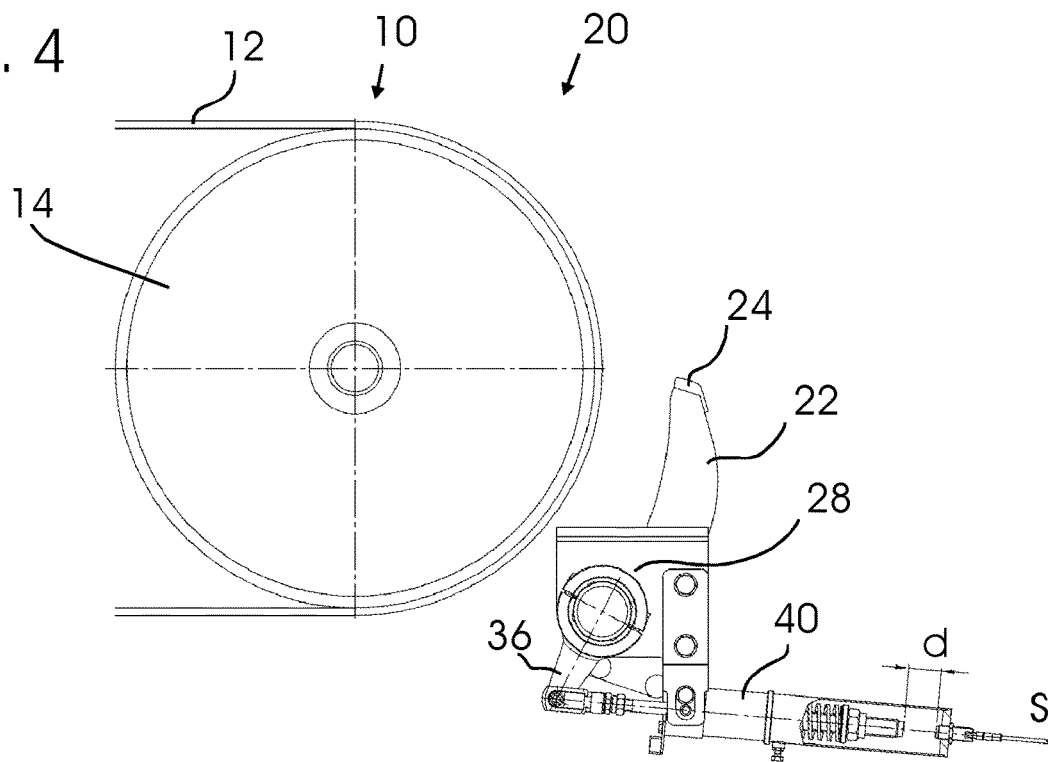
FIG. 4 shows the belt scraper from FIG. 1-3 in a side view with the scraper elements pivoted away.

FIG. 1 shows a portion of a conveyor system 10 with a conveyor belt 12. In the area of a deflection and ejection drum 14, which rotates around a drum axis 16, a belt scraper 20 is arranged according to a first embodiment.

Using the belt scraper, conveyed material that is located on the belt 12 and partly adheres to it is scraped off the belt 12. In so doing, the belt scraper 20 is used as a pre-scraper, i.e., it is located above a receptacle or a chute (not shown) for receiving the conveyed material.

The belt scraper 20 has several scraper blocks 22 that are arranged side by side in a transverse direction. In the embodiment shown, the scraper blocks 22 are designed as solid bodies made from plastic and are provided with a cap 24 made from hard metal at the upper end. The scraper blocks 22 represent scraper elements which, as shown in FIG. 2, are brought into abutment with the belt 12 so that they are in contact with the surface of the belt 12 along a flat or linear contact area.

The scraper blocks 22 are attached to a rotatable transverse carrier 26, which extends on both sides into axis elements 32 that are mounted in bearings 28 in such a way that the scraper blocks 22 are, together with the transverse carrier 26, arranged pivotably around a pivoting axis 30 by rotating the axis elements 32.

On the bearings 28, spring devices 34 are provided on both sides for the transverse carrier 26 and the axis elements 32. As can be seen in particular in FIG. 3, such spring devices each comprise a pivoting arm 36, which extends in a straight manner from the pivoting axis 30, and a spring rod 38 that is hinged on the end thereof. The spring rod 38 is linearly movable inside a cylindrical housing 40 and is subjected to a tensile force in the longitudinal direction by a compression spring 42. Via the spring rod 38 and the pivoting arm 36, the entire arrangement of the scraper blocks 22 on the transverse carrier 26 is thereby subjected to a torque acting against the rotating direction of the drum 14 so that the scraper blocks 22 are pushed onto the surface of the belt 12 with a force.

The pivoting arm 36 is arranged in a rigid manner relative to the scraper blocks 22 and can be pivoted together with them around the pivoting axis 30. As can be seen in particular from FIG. 3, in the exemplary embodiment shown the pivoting arm 36 is arranged opposite the scraper blocks 22 with regard to the pivoting axis 30, i.e., a first direction from the pivoting axis 30 up to the front edge of the abutment surface of the scraper blocks 22 and a second direction from the axis 30 to the hinge point of the spring rod 38 at the end of the pivoting arm 36 form an obtuse angle w. In alternative embodiments, other arrangements can also be chosen where another angle w results, for example even an acute angle.

The housing 40 of the spring rod is not fully stationary relative to the conveyor frame (not shown) of the conveyor device 10 but it is hinged relative to it as shown in FIG. 3 so that it can execute a pivoting movement. The movement of the housing 40 is coupled with the movement of the scraper elements 26 via the spring rod 38, the pivoting lever 36, and the transverse carrier 26 in this context. However, the coupling is designed such that the housing 40 will only execute a movement that is significantly reduced by comparison with a pivoting movement of the scraper element 26, i.e., a pivoting movement by a significantly reduced pivoting angle.

A sensor 44 is arranged on the spring device 34 with which the angular position of the scraper blocks 22 can be determined and output as an electrical sensor signal S. In FIG. 3, a pivoting angle a is shown as an example between a first direction from the pivoting axis 30 to the front edge of the abutment surface of the scraper block 22 on the belt 14 (in the starting state of the scraper block 22, the abutment surface is relocated due to wear as will be shown later on) and a second direction, which is shown here horizontally as a reference.

The sensor 44 detects a distance d between an index part 46 at the end of the spring rod 38 and a detecting part 48, which is attached at the end of the cylindrical housing 40.

The distance d is directly dependent upon the angular position a of the scraper blocks 22. With a pivoting movement of the scraper blocks 22 in the direction of the belt 12 as takes place for example in case of advancing wear (FIG. 5), the angle a will grow larger. Via the coupling by the pivoting lever 36 and the rod 38, the distance d between the end of the rod 38 and the end of the housing 40 is reduced, i.e., also the distance between the index part 46 and the detecting part 48 of the sensor 44. The correlation between a and d is nearly linear in the angular range shown wherein the pivoting arm 36 and the spring rod 38 are arranged in an almost orthogonal manner to one another. With an opposite-handed pivoting movement, when the scraper blocks 22 pivot away from the belt 12, the angle a becomes smaller, and the distance d grows larger.

FIG. 10 schematically shows the structure of the sensor 44. In a preferred embodiment, a magnetic or magneto-inductive sensor is used wherein the index part 46 is designed as a disc-shaped permanent magnet that is magnetized in the direction of the sensor longitudinal axis.

The detecting part 48 of the sensor is arranged at the distance d from the index part 46 and comprises a magnetic field sensor element 54 and an electrical detecting and analysis circuit 52 connected thereto in a sensor housing. The detecting and analysis circuit 52 is operated with an electrical power supply via a cable connection 50.

Dependent upon the distance d, the permanent magnet of the index part 46 generates a different magnetic field at the location of the magnetic field sensor element 54 so that a measurable physical property of the magnetic field sensor element 54 changes.

Depending on the type of sensor, different types of magnetic field sensor elements 54 can be used. For example, a Hall element can be used as the magnetic field sensor element 54 the resistance of which changes as a function of the magnetic field. Also usable is a magnetically soft material the permeability of which changes as a function of the magnetic field, for example as described in DE 10 2007 062 862 A1.

The detecting and analysis circuit 52 operates the magnetic field sensor element 54 as required for detecting the magnetic field, analyzes the measurable properties thereof, and converts them into a sensor signal S. The sensor signal S is output via the cable connection 5o as an electrical signal, for example as a current or voltage signal.

The sensor signal S can be assigned unambiguously to the distance d, wherein the dependence is preferably at least substantially linear within the possible pivoting range of the scraper blocks 22.

Figure 5:
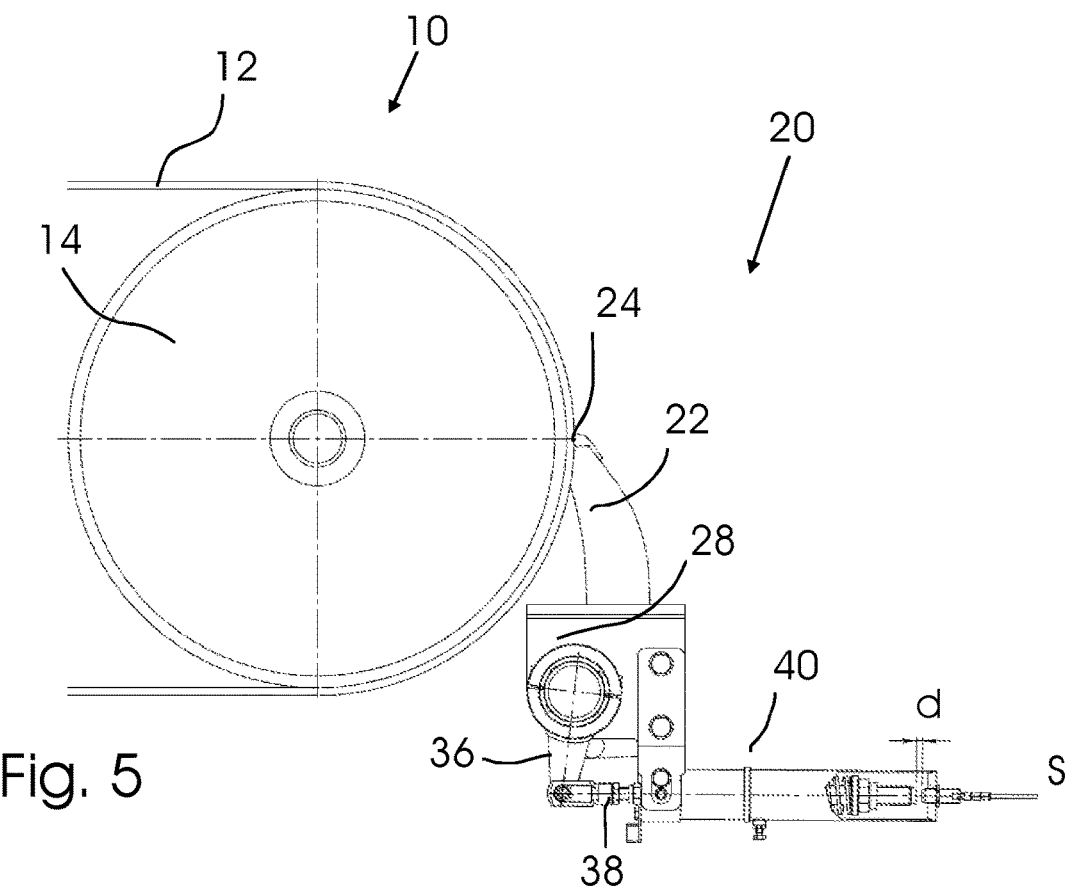
FIG. 5 shows the belt scraper from FIG. 1-4 in a side view after an occurrence of wear.
Figure 6:
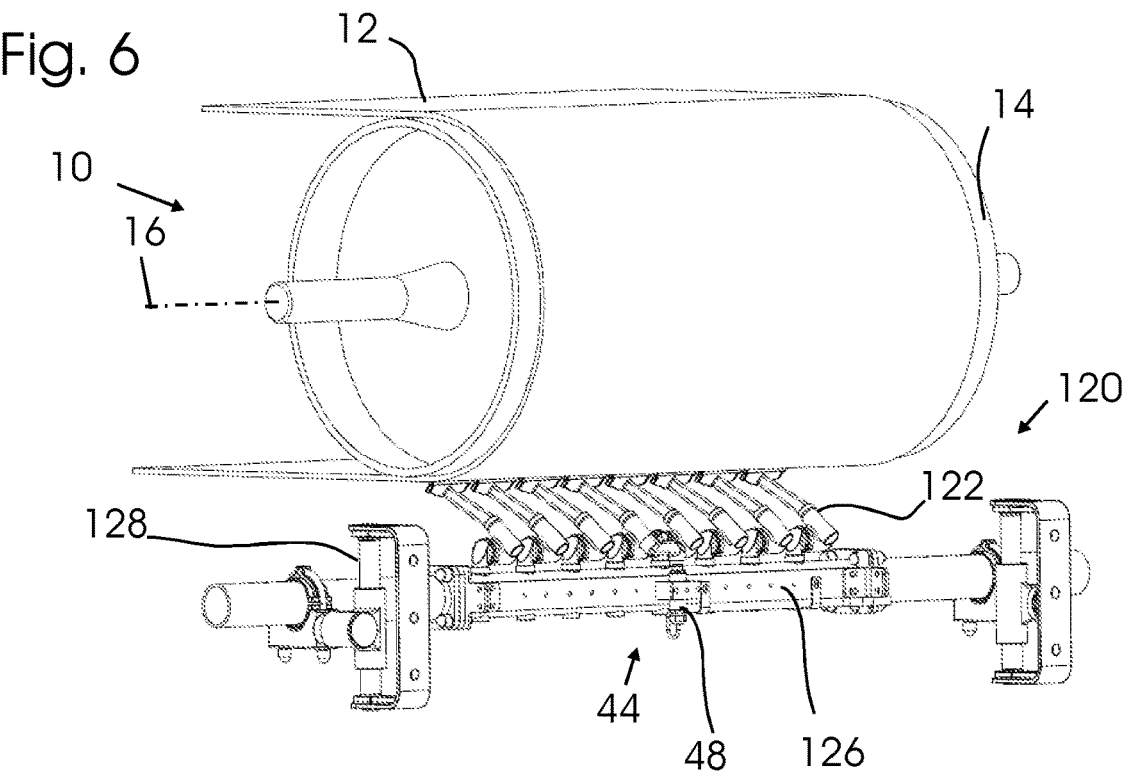
FIG. 6 shows a perspective view of a second embodiment of a belt scraper with a plurality of scraper modules.

By analyzing the sensor signal S, for example a progressing wear of the scraper element, in this case the scraper blocks 22, can be determined. As shown in FIG. 5 as an example, the constant abutment of the scraper blocks 22 with the moving belt 12 result in abrasion so that the angle a will grow larger over the course of the operating duration. This is indicated by a change in the sensor signal S so that it becomes possible to monitor wear, wherein an indication is given when the scraper blocks 22 must be replaced.

The sensor 44 is, as explained above, arranged on the scraper 20 in such a way that the autonomous index part 46 is attached to a part that is moving synchronously with the pivoting movement of the scraper element 24, i.e., the rod 38. The detecting part 48 is affixed to an almost stationary part that executes a movement that is significantly reduced compared to the movement of the scraper element 24, i.e., to the housing 40 of the spring unit 34. This way, the cable routing is facilitated since the cable 50 must compensate only for the minor movement of the housing 40.

In the following, a second embodiment of a scraper 120 is described with reference to the representations in FIG. 6-9. The scraper 120 is also mounted on a conveyor system 10. The same reference numbers refer to the same embodiments.

The scraper 120 has a stationary transverse carrier (system carrier) 126, which is height-adjustable but not rotatable and on which several scraper modules 122 are arranged side by side. With regard to the design and arrangement of the scraper modules 122, reference is made to the detailed representation in WO 2014/106621 A2.

Figure 7:
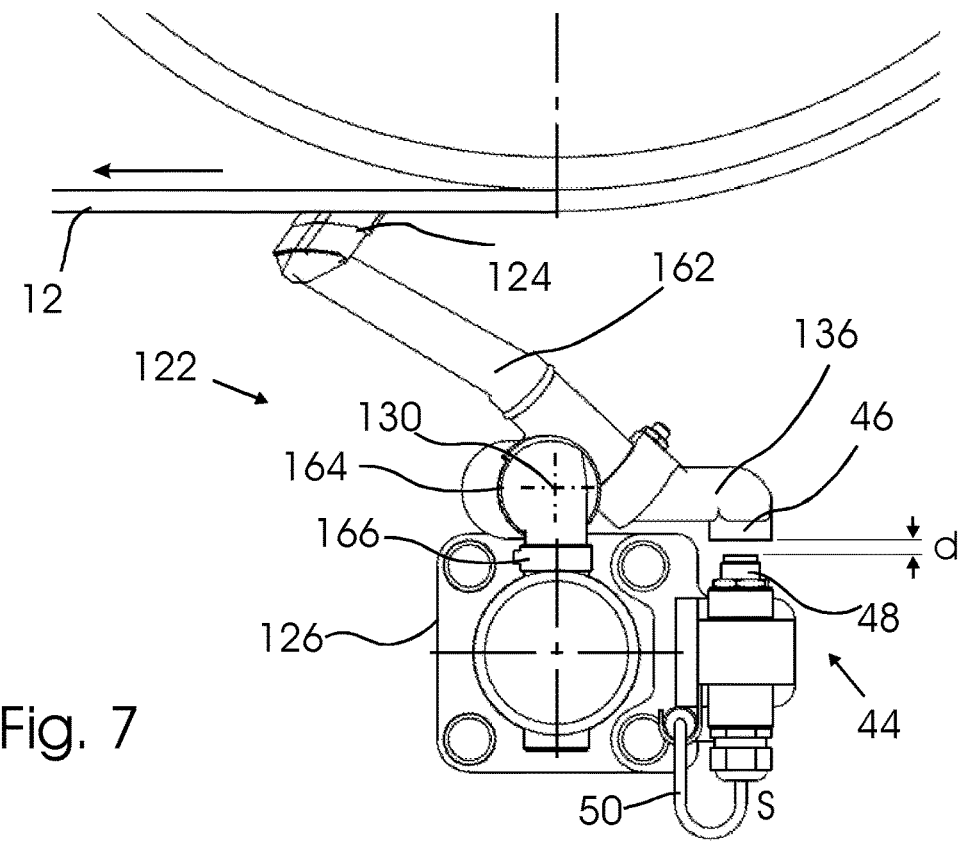
FIG. 7 shows a scraper module from FIG. 6 in a side view.

One of the scraper modules 122 is represented in FIG. 7 in a side view along the axis of the system carrier 126, in FIG. 8 in a side view along a module pivoting axis 130, and in FIG. 9 in a frontal view. It comprises a hard metal blade 124 designed for the scraping abutment with the belt 12, such blade being attached to a cutter carrier 162, which is pivotable in a joint 164 around the module pivoting axis 130. A foot 166, which carries the joint 164, is mounted in the system carrier 126. The scraper module 122 is slanted under a small angle relative to the transverse direction so that the module pivoting axis 130 is oriented horizontally and extends substantially transverse to the running direction of the belt 12 but does not exactly correspond with the longitudinal axis of the system carrier 162.

The cutter carrier 162 and the blade 124 attached thereto is, as is hinted at in FIG. 8, arranged in the joint 164 so as to be pivotable around the module pivoting axis 13o. The pivoting angle a can for example be defined as shown in FIG. 8 between a direction from the module pivoting axis 130 to the front edge of the blade 124 and a horizontal line.

Inside the joint 164, a torsion spring (not shown) acts in such a way that the cutter carrier 162 is subjected to a torque through which the blade 124 is pushed in the direction of coming into abutment with the belt 12.

A front edge of the blade 124 abuts the surface of the belt 12. When the belt 12 is running, adhering conveyed material is thus scraped off.

A pivoting arm 136 is mounted rigidly relative to the cutter carrier 162 so that it is also pivotable around the module pivoting axis 130. The pivoting arm 136 is attached in extension of the cutter carrier 162, being clamped on in the example shown, so that a pivoting of the cutter carrier 162 and the blade 124 results in a similar pivoting movement of the pivoting arm 136.

A sensor 44 is arranged in such a way as to detect the pivoting angle a of the cutter carrier 162 and the blade 124. The sensor 44 comprises an index part 46 mounted at the end of the pivoting arm 136 and a detecting part 48 attached to the system carrier 126.

The sensor 44 is the same sensor as was explained before with reference to FIG. 10, i.e., the distance d from the index part 46 is detected by means of the detecting part 48 and such distance is output as a sensor signal S via the cable connection 50.

The distance d is, as indicated for example in FIG. 8, dependent on the positions taken by the cutter carrier 162 and the blade 124, i.e., on the angle a. When the blade 124 is pivoted away from being in abutment with the belt 12 (indicated by the dotted line in FIG. 8), as would occur in the case of obstacles on the belt 12 that cannot be scraped off, the angle a grows in the example shown to a value a1 and thus the distance d becomes a greater value di.

With gradual wear of the blade 124, the angle a and thus the distance d are reduced.

In the sensor signal S, both situations are recognizable so that it is possible for example to monitor the wear progression as was explained in the context of the first embodiment.

With the second embodiment, the detecting part 48 is mounted on a stationary element, i.e., the system carrier 126, so that a simple cable routing is ensured. The index part 46 is arranged on a movable element, i.e., the pivoting arm 136.

The pivoting arm 136 extends with reference to the module pivoting axis 130 in a direction that is substantially opposing the direction of the blade 124, i.e., a first direction from the module pivoting axis 130 to the front edge of the blade 124 and a second direction from the module pivoting axis 130 up to the index part 46 at the end of the pivoting arm 136 form an obtuse angle. Viewed in the running direction of the belt 12 (FIG. 7), the joint 164 is located on the module pivoting axis 130 between the end of the pivoting arm 136 and the blade 164. The sensor 44 is thus distanced sufficiently far from the blade 124 so that it will not be impaired by conveyed material that was scraped off.

The invention claimed is:

1. A belt scraper with
a scraper element to be brought into abutment with a belt,
wherein the scraper element is pivotably arranged with reference to a pivoting axis, wherein a spring element generates a torque acting on the scraper element, wherein said spring element is a helical spring, a leaf spring, a torsion rod spring, a plate spring, or a block spring,
and wherein a sensor is provided for determining a pivoting angle of the scraper element,
wherein
the sensor is a contactless sensor which has an index part and a detecting part for detecting the position of the index part relative to the detecting part,
wherein the index part is arranged, at a distance from the pivoting axis, on a movable element that is coupled with the scraper element,
wherein a pivoting arm is provided which extends from the pivoting axis and is coupled with the scraper element,
wherein a rod is hinged to the pivoting arm, and the index element is arranged on the rod,
and wherein the rod is arranged inside a surrounding housing to be movable relative to said housing, and the detecting part is mounted on the housing.

2. The belt scraper according to claim 1, wherein:
the index part is autonomous,
and the detecting part is connected via an electrical connection cable.

3. The belt scraper according to claim 1, wherein:
the detecting part has an electrical detection and analysis circuit,
wherein the electrical connection cable is connected to supply the detection and analysis circuit with electrical power and/or to transmit an electrical signal for the position of the index part.

4. The belt scraper according to claim 1, wherein:
the detecting part is mounted on an element that is stationary relative to a conveyor frame of the belt or on an element which is less movable relative to a conveyor frame of the belt than the scraper element.

5. The belt scraper according to claim 1, wherein:
the scraper element is arranged on a carrier that is rotatably mounted in a bearing,
wherein the bearing is arranged axially between the sensor and the scraper element.

6. The belt scraper according to claim 1, wherein:
the pivoting arm extends from the pivoting axis in a direction that forms an angle of more than 90° with the direction of the scraper element.

7. The belt scraper according to claim 1, wherein:
the pivoting axis is arranged between the sensor and the scraper element viewed in the running direction of the belt.

8. The belt scraper according to claim 1, wherein the spring element is arranged inside the housing.

9. The belt scraper according to claim 1, wherein:
the index part comprises at least one magnetic element,
and the detecting part comprises at least one magnetic field sensor element.

10. The belt scraper according to claim 1, wherein:
the scraper element and the sensor are arranged in an axial direction of the pivoting axis at a distance from one another.

11. A method for operating a belt scraper wherein:
a scraper element is brought into abutment with a belt,
wherein the scraper element is pivotably arranged with reference to a pivoting axis,
wherein a spring element generates a torque acting on the scraper element, wherein said spring element is a helical spring, a leaf spring, a torsion rod spring, a plate spring, or a block spring,
and wherein a sensor signal is generated by means of a sensor to indicate a pivoting angle of the scraper element,
and wherein the sensor is a contactless sensor which has an index part and a detecting part for detecting the position of the index part relative to the detecting part,
and wherein the index part is arranged, at a distance from the pivoting axis, on a movable element that is coupled with the scraper element,
wherein a pivoting arm is provided which extends from the pivoting axis and is coupled with the scraper element,
wherein a rod is hinged to the pivoting arm, and the index element is arranged on the rod,
and wherein the rod is arranged inside a surrounding housing to be movable relative to said housing, and the detecting part is mounted on the housing.

12. A belt scraper, with:
a scraper element to be brought into abutment with a belt,
wherein the scraper element is pivotably arranged with reference to a pivoting axis, wherein a spring element generates a torque acting on the scraper element, wherein said spring element is a helical spring, a leaf spring, a torsion rod spring, a plate spring, or a block spring,
and wherein a sensor is provided for determining a pivoting angle of the scraper element,
wherein the sensor is a contactless sensor which has an index part and a detecting part for detecting the position of the index part relative to the detecting part, wherein the index part is arranged, at a distance from the pivoting axis, on a movable element that is coupled with the scraper element,
wherein
a foot part is attached to a transverse carrier,
and a joint is arranged on the foot part, wherein the scraper element is pivotably mounted in the joint,
wherein the detecting part is attached to the transverse carrier.

* * * * *